July 13, 1937.   H. J. HASBROUCK, JR., ET AL   2,086,769
GALVANOMETER MOUNT
Filed May 22, 1935
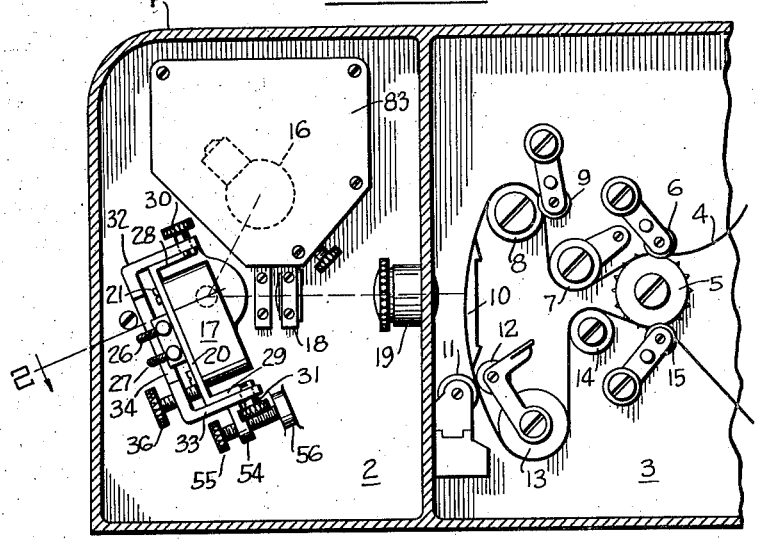
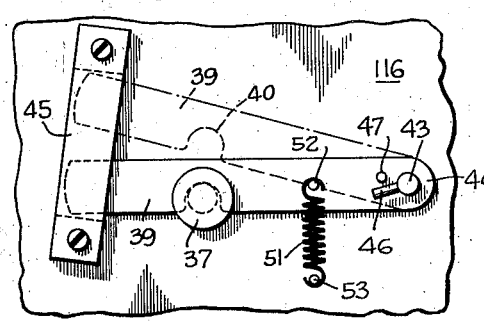
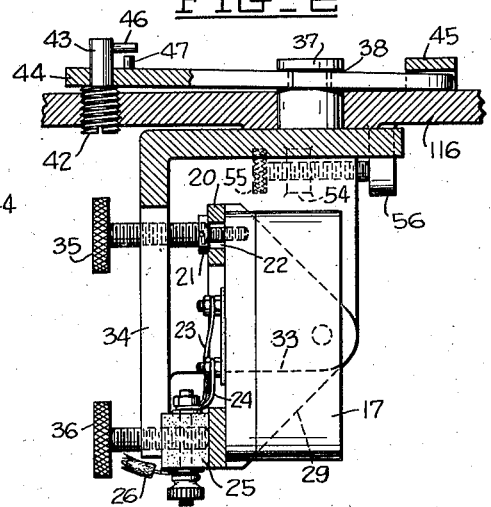
INVENTORS
Harold J. Hasbrouck, Jr.
Ernest Ross.
BY
ATTORNEY Patented July 13, 1937

2,086,769

UNITED STATES PATENT OFFICE 2,086,769

GALVANOMETER MOUNT

Harold J. Hasbrouck, Jr., Flushing, and Ernest Ross, Elmhurst, N. Y., assignors to United Research Corporation, Long Island City, N. Y., a corporation of Delaware Application May 22, 1935, Serial No. 22,788

11 Claims. (Cl. 179—100.3)

This invention relates to sound recording apparatus wherein a galvanometer such as that disclosed and claimed in co-pending application Serial No. 20,923, filed May 11, 1935, is employed to record a variable area sound record.

An object of the invention is to facilitate the proper optical adjustment of the galvanometer in its mount and facilitate the adjustment of the mount with respect to the optical system of the apparatus.

In recording systems in which galvanometers are used, a beam of light of constant intensity is projected upon a mirror within the galvanometer and deflected therefrom across a slit, vibration of the mirror varying the quanta of light being passed by the slit onto a film or other light sensitive medium. The beam of light in passing from the mirror to the film passes through apertures and lenses and it is important that the position of the mirror is on an axis passing through these lenses and apertures as well as in alignment with the beam of light from the light source, also having a preferred optical path which may include lenses and apertures. It is also necessary to tilt the mirror at the proper angle with respect to the incident light beam to enable the light to be reflected to the film.

In order, therefore, to adjust the galvanometer in position on its mount, we provide a templet which aligns the vibrating mirror or the galvanometer with respect to the axes of rotation of the mount itself. This adjustment embodies the movement of the galvanometer in a plane and locates the mirror at the intersection of the two axes of rotation which are at right angles to one another. This adjustment is permanent and locates the mirror at a point which permits it to pass light from the light source to the film when the mount is fastened to its support and adjusted to provide the mirror with the proper angle of reflection.

The mount is adjustable in two directions when attached to the rest of the apparatus, this attachment including a locking arrangement at the back of its supporting wall which permits loosening of the mount for one pivotal adjustment thereof. This locking device is operated anteriorly of the wall, the complete releasing of the mount from its supporting wall being possible from this position.

Other features of the invention, as well as the invention itself, will be more fully understood by referring to the following specification read in conjunction with the accompanying drawing, in which Fig. 1 is a sectional view through part of a sound recording apparatus showing the relative positions of the light source, galvanometer, slit, objective lenses, and film.

Fig. 2 is a plan sectional view of the galvanometer and its mount taken along the line 2—2 of Fig. 1.

Fig. 3 is a rear elevational view of the locking means for attaching the galvanometer mount to the wall of the apparatus.

Figs. 4 and 5 are perspective views of the galvanometer and its aligning templet, respectively; and Fig. 6 is a detail view of a pivotal support of the galvanometer mount showing a portion of the templet in position.

Referring now to Fig. 1, the sound recording apparatus is provided within a casing 1 comprising two compartments 2 and 3. The compartment 3 is of lightproof construction and houses the various film sprockets, rollers, etc. The film 4 is fed from a supply reel (not shown) onto the upper surface of a drive sprocket 5 having a pad roller 6 associated therewith and thence under a tensioning roller 7, over an idler roller 8 having an edge guide 9 associated therewith, and down past a sound gate 10, where a modulated light beam is impressed thereon. From the sound gate the film passes between a flywheel roller 11 and its associated spring pressed roller 12, then under roller 13, over roller 14 and onto the under surface of the drive sprocket 5 against which it is held by the pad roller 15. From here the film 4 is drawn onto a take-up reel (not shown).

Referring now to the compartment 2, a lamp 16 of constant intensity projects a beam of light through an appropriate optical system onto a galvanometer 17 where it is reflected through a slit assembly 18, through an objective lens 19 and thence onto the film 4 as it passes the sound gate 10. The lamp 16 is shown dotted in its housing 83 and is adjustable therein, the means for mounting and adjusting the lamp being the subject matter of co-pending application Serial No. 24,831 filed June 4, 1935, in which it is claimed.

The galvanometer 17 may be of the conventional type or of the type disclosed and claimed in co-pending application Serial No. 20,923 filed May 11, 1935, used in recording a variable area sound record upon a motion picture film, and in which a pair of vibrating conductors having a mirror attached thereto are placed in a strong magnetic field. When an audio frequency current is sent through the conductors the interaction between the alternating current and the magnetic field will cause the conductors and consequently the mirror to vibrate in accordance with the current modulations.

Referring to Figs. 1 and 2, the galvanometer 17 is mounted upon a base member 20 by means of screws 21 which project through enlarged openings 22 in the base 20 and are threadably secured within the galvanometer 17. Thus the galvanometer 17 may be laterally adjusted within certain limits upon the base 20. Conductors 23 and 24 leading from the rear of the galvanometer 17 are attached to a terminal block 25 which is secured in any suitable manner to the rear of the base 20. Conductors 26 and 27 leading to speech current amplifiers are attached to the front of the terminal block 25. The upper and lower ends of the base 20 form flanges 28 and 29 having threaded end portions of studs or axles 30 and 31. The outer portions of the studs 30 and 31 are adapted to be journaled in bearings provided in flanges 32 and 33 formed on an L-shaped bracket 34 comprising the galvanometer mount.

In order to adjust the galvanometer and its base about the vertical axis a pair of adjusting screws 35 and 36 are provided, being threadably mounted in the galvanometer mount 34 and having their ends engaging the rear surface of the base 20. The galvanometer mount 34 is attached to the wall 116 of the recorder by means of a stud or axle 37 which projects through an aperture provided in the wall 116. A groove 38 (see Figs. 2 and 3) near the end of the axle 37 is adapted to be engaged by a groove 40 provided in a lever 39 of a locking means for securing the mount 34 onto the wall 116. The locking means comprises a screw 42 threadably mounted in the wall 116 and has a reduced portion 43 extending from the end thereof on which is loosely journaled the end 44 of the lever 39. The other end of the lever 39 is slidable within guide 45 which also limits the upward and downward movement of the lever 39 about its pivot 43. At the end of the reduced portion 43 of the screw 42 is a projecting pin 46 adapted to engage a pin 47 projecting from the lever 39. When the screw 42 is screwed inwardly, the screw 42 engages the end 44 of the lever 39 and forces it outwardly thereby drawing the bracket 34 into engagement with the wall 116.

When the bracket or mount is to be removed, the screw 42 is unscrewed which relieves the pressure on the lever 39. Further withdrawal of the screw 42 permits the projection 46 to engage the pin 47 on the lever 39 and thus rotate the lever 39 into the position shown by the dot and dash lines in Fig. 3 which permits the axle 37 to be withdrawn. A spring 51 is provided, one end of which is secured to the lever 39 as at 52 while the other end is secured to the wall 116 as at 53 so as to normally hold the lever 39 in a downward position. Thus it will be seen that the lock may be operated from the front of the recorder by any suitable tool such as a screwdriver.

In order to adjust the galvanometer 17 and its mount 34 about a horizontal axis, a lug 54 is provided on the lower flange 33 of the mount 34 in which is threadably mounted an adjusting screw 55, the free end of which is adapted to engage a lug 56 provided on the wall 116.

The galvanometer 17 is adjusted within its mount by means of a templet as shown in Fig. 5. The templet comprises a body portion 57 and three legs 58, 59, and 60 having V-shaped notches 61, 62, and 63, respectively, provided at their extremities. A U-shaped member 64 is rigidly secured as by welding to the face of the body portion 57 and has a peep hole 65 in its outer face which is in line with a second hole 66 provided in the body portion. When the galvanometer 17 is to be adjusted, the mount 34 is withdrawn or removed from the wall 116 and the templet placed thereon so that the notches 61, 62, and 63 engage the studs or axles 30, 31, and 37 respectively. By sighting through the peep holes 65 and 66 at the mirror through lens 41, the galvanometer 17 may be adjusted until the mirror is correctly aligned on its base 20 with respect to the peep holes. This will insure that the galvanometer mirror will be properly aligned when the galvanometer is secured within the recorder and that it will be located at the intersection of the axis of rotation about the axle 37, and the axis of rotation about the studs 30 and 31. After this adjustment is made the screws 21 are tightened and the galvanometer is fixed to its base 20. Holes 117 and 118 are provided above and below the hole 66 so that the mirror may receive light and thus be seen. In Fig. 6 the relation of the legs 58, 59, and 60 with respect to 30, 31, and 37 is shown in a detail of leg 58 and stud 30.

What is claimed is:

1. In a mounting for a vibrating element, a light deflector on said element, a base for said element, means for mounting said base to rotate in one direction, and means connected to said last mentioned means for rotating said base in another direction, the intersection of the axes of rotation corresponding to the position of said light deflector.

2. In a system for varying the direction of a light beam, the combination of a light deflector, means for supporting said deflector, means for mounting said supporting means, said mounting means being adapted to rotate said deflecting means in two directions normal to one another, and means for adjusting said light deflector on its supporting means so that its position coincides with the intersection of the axes of rotation of said mounting means.

3. In a system for controlling the deflection of a light beam, the combination of means for deflecting a light beam, a rotatable mounting for said deflecting means, and rotatable means on said mounting for adjusting the operating position of said deflecting means, said operating position being such that said deflecting means lies at the intersection of the axes of rotation of said mounting and adjusting means, said axes being normal to one another.

4. In a mounting for a light deflecting element, the combination of an element for deflecting a light beam, said deflecting element being adapted to vibrate about a definite axis, means for supporting said light deflecting element at points along said axis, and means for supporting said last mentioned means along an axis normal to said first axis, said deflecting element lying at the intersection of said axes.

5. A galvanometer mount for attachment to a supporting wall, an axle on said mount adapted to be inserted in an aperture in said wall, a locking bar adapted to hold said axle in said aperture on one side of said wall, and means adapted to tighten said bar on said axle and remove said bar from said axle, said means being operable from the other side of said wall.

6. A mounting in accordance with claim 5 in which said last mentioned means comprises a screw having a body portion and a smaller extended portion, said extended portion having a projection therefrom for engaging said bar at a predetermined position from said wall.

7. A device for locking a light deflecting element to a wall support comprising a U-shaped bracket adapted to rotate said light deflecting element about a certain axis, a second U-shaped bracket supporting said first bracket and having an axle thereon positioned in an aperture in said wall, said first U-shaped bracket being rotatable about said axis, a bar mounted on the wall opposite from said brackets and adapted to attach to said axle, and means for detaching said bar from said axle from the bracket side of said wall.

8. A galvanometer mount comprising a U-shaped base member, means for adjustably attaching a galvanometer to said base member, a second U-shaped member supporting said first member, said first member being adapted to rotate on an axis connecting the points of support between said U-shaped member, an axle for said second U-shaped member, and means for determining the position of said galvanometer on said first U-shaped base member.

9. A galvanometer mount in accordance with claim 8 in which said last mentioned means comprises a templet contacting said mount at the points of rotation thereof, the adjustment of said galvanometer being determined by a beam of light through said templet to said galvanometer.

10. The method of positioning a deflecting element at the intersection of two axes of rotation of said deflecting element comprising optically aligning said deflector by a beam of light whose path is predetermined with relation to the axes of rotation of said deflector.

11. The method of positioning the mirror of a galvanometer at the intersection of the axes or rotation of the mount for the galvanometer comprising optically aligning said mirror with a beam of light whose path is predetermined with respect to the intersection of the axes of rotation of said mount.

HAROLD J. HASBROUCK, Jr.
ERNEST ROSS.